Oct. 30, 1962 — H. W. JEWELL — 3,061,339
PIPE COUPLING
Filed March 25, 1960

INVENTOR.
HOWARD W. JEWELL
BY Miketta and Glenny
ATTORNEYS.

United States Patent Office 3,061,339
Patented Oct. 30, 1962

3,061,339
PIPE COUPLING
Howard W. Jewell, Islington, Ontario, Canada, assignor, by decree of distribution, to Maryola Jewell
Filed Mar. 25, 1960, Ser. No. 17,643
3 Claims. (Cl. 285—236)

This invention pertains to an improved coupling for various types of pipe, and is particularly directed to a device for connecting adjacent end sections of plain end or tapered end pipe and single or multiple duct conduit made from clay or other ceramic composition, fiber, cement-asbestos, cast iron, steel, plastic, etc.

Probably the most time-consuming and expensive factor in laying pipelines for the transmission of fluids, gases, heat, air and the containing of wires and cables such as in underground power and communication circuits is the connecting of adjacent lengths of pipe one to the other in substantially axial alignment. The use of threaded joints is only justified in high pressure lines, and low pressure lines or lines which operate at pressures of say not over about two hundred per square inch are very often connected by the use of various cementing materials. The old bell and spigot type of pipe has been used extensively in many soil lines, water lines, sewage lines and the like, but the joints so made are not satisfactory and a great deal of time is spent in pouring or wrapping the joints. As a result many attempts have been made to employ plain end pipe and surround the adjoining ends of adjacent sections of such pipe with a collar, clamp or coupling which will suitably hold the adjacent ends in alignment and at the same time provide an adequate seal. One of the great difficulties encountered in this work lies in the fact that the adjacent or joining end portions of these sections of pipe and conduit are not of exactly the same diameter. Manufacturing procedures and imperfections result in adjoining end portions of pipe which differ in diameter, differ in contour and contain various imperfections such as chips, rough spots, out of round portions, flare and the like. It is difficult, by the use of former devices, to obtain a tight firm seal between such different end portions of pipe. In addition, it is to be remembered that every type of pipe has some form of imperfection such as chips, blisters, mould marks, lasting beads, surface feathering, etc. Moreover, lengths of pipe should be maintained in firm engagement so that in the event the sub-stratum or supporting earth is removed, such as by yielding sub-grades, fluid exfiltration and subsequent undermining or settling, a considerable length of such connected piping will hold together and resist collapse. These and various other problems have occurred in the past and some attempts have been made to solve them, as for example by the construction illustrated in prior Patent 2,530,700.

The present invention is directed to a solution of all of these problems by means of a device which is inexpensive, readily installed, readily assembled, and whereby the tightening forces are applied in such manner as to prevent cracking of the pipe or damage to the device itself. In the exemplary form of device described in detail hereinafter, pre-formed rubber composition and organic plastic elements are employed in order to apply these forces uniformly, permit the device to accommodate itself to irregularities in the surface pipe and variations in pipe contour and diameter, and to provide guideways for the tightening belts. The device of the present invention also provides a construction which holds the tightening belts very firmly and permits tension to be applied thereto in a most effective manner. Moreover, the device of the present invention includes means for facilitating the imposition of a desired tension in the tightening belts, thereby preventing crushing or collapse of the pipe ends being joined together.

Reference will be made to the accompanying drawings in which.

Figure 1:
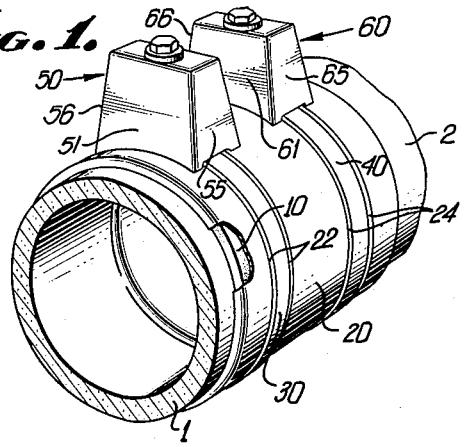
FIG. 1 is a perspective view of a coupling according to the invention assembled over a joint between two adjacent ceramic pipe sections.

An exemplary embodiment of a pipe coupling, according to the invention, is shown in FIG. 1. It is generally composed of a preformed rubber band 10, which completely surrounds and joins the two pipe sections 1 and 2 at their adjoining edge portions; a preformed shield or band housing 20, which protectively covers the resilient band 10; two tightening belts 30 and 40, which bind, compress and hold the band 10 and shield 20 assembly to the pipe sections 1 and 2; and two housings 50 and 60, in which the tightening belts 30 and 40 respectively abut and are fixedly constrained.

Figure 2:
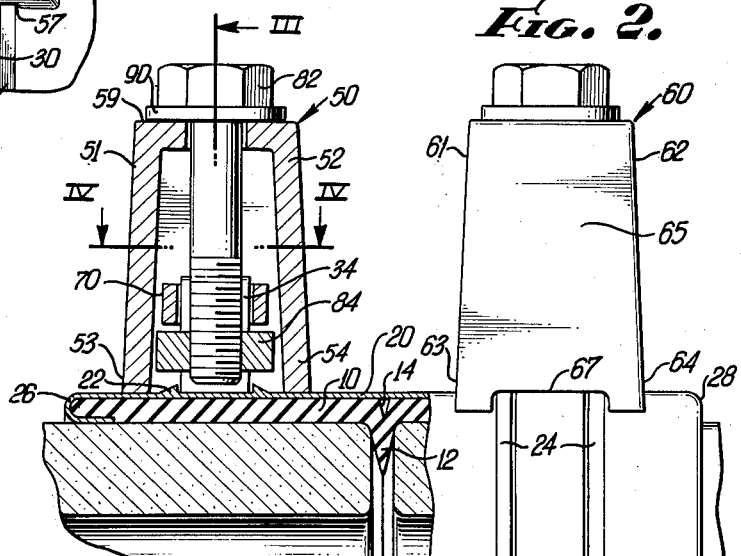
FIG. 2 is a partially sectioned side elevation of the coupling of FIG. 1.

Preformed rubber band 10 is preferably made of extruded rubber, resilient synthetic rubber composition or organic plastic in continuous strips which may be cut to desired lengths and vulcanized or cemented into rings of suitable size to surround and snugly fit a pipe section. The rubber band 10 may be compounded with a wax that exudes when the band is placed under compression to facilitate adherence of the band 10 to the pipe surface. Band 10 may be extruded with a medial tension relieving section comprising, as best seen in FIG. 2, an inwardly extending flange or lip 12, on the inner surface, and a groove 14 formed in the outer surface. Since various pipe sections may be out of round or differ widely in outside diameter, as frequently occurs in clay pipe sections, there may be a drawing of the middle section of band 10 over the edge of the larger diameter when the coupling is tightened on both sections. The rubber band 10 would thereby normally be put under tension which might cause cracking and failure of the coupling in this area. Groove 14 in the middle section of band 10 prevents the occurrence of such undue drawing and failure causing tensions by providing the band 10 with added flexibility in this area. The lip 12 serves to form a stop ring against which the ends of the pipe sections 1 and 2 may resiliently abut. Band 10 is preferably unperforated and has smooth inner and outer surfaces, except for the lip 12 and groove 14. It can be readily seen, therefore, that a coupling employing a band 10, according to the invention, will compensate for deviation in diameter, contour and imperfections in end portions of adjoining pipe sections while maintaining an effective seal around the joint between such pipe sections.

A plastic shield or band housing 20 is provided to circumferentially overlie and cover the rubber band 10 and hold it firmly in place on the pipe sections 1 and 2. Band housing 20 is preferably a preformed extrusion made of a moldable organic plastic material having a smooth inner surface to contact the rubber band 10. The band housing 20 may be formed from lengths cut from continuous strips of extruded material which are formed into rings by overlapping end portions and bonding them together with suitable resinous bonding compositions. When extruded in continuous strips, band housing 20 may be integrally provided with two pairs of parallel and spaced raised or upstanding beads 22 and 24 each pair serving as a guide channel for the tightening belts 30 and 40 respectively. Longitudinal edge portions 26 and 28 are curved or inturned into spaced relationship with the inner surface of band housing 20, as shown in FIG. 2, to grasp the marginal edges of the band 10 and retain it within the band housing 20. Inturned edge portions 26 and 28 also serve to protect the band 10 from having its edges turned under when either of the pipe sections 1 or 2 is pressed into the coupling assembly and provide added stiffness to the coupling. When the pipe sections 1 and 2 are under internal pressure, as when containing water under pressure, the inturned edge portions 26 and 28 and the two pairs of upstanding beads 22 and 24, with tightening belts 30 and 40 thereon, cooperate to keep the two pipe sections from separating at the joint therebetween without the requirement of added end restraints. The coupling will therefore allow various fluids to be transmitted through pipe such as the sections 1 and 2 without reducing the maximum internal fluid pressure which may be effectively transmitted.

Tightening belts 30 and 40 which overlie the band housing 20, and band 10 contained therein, are positioned in the guide channels formed by the two pairs of parallel and spaced upstanding beads 22 and 24 as shown in FIGS. 1 and 2. Belts 30 and 40 may be made of rubber coated steel or of stainless steel to withstand the corrosive conditions normally found in underground piping installations. Belts 30 and 40 substantially surround the coupling in contact with the band housing 20, except where each is fixed within the hollow metallic tightening housing 50 and 60 respectively, applying a compression force about the pipe sections 1 and 2 in a uniformly distributed manner to bind the coupling thereon in a sealed, tight fit.

Figure 3:
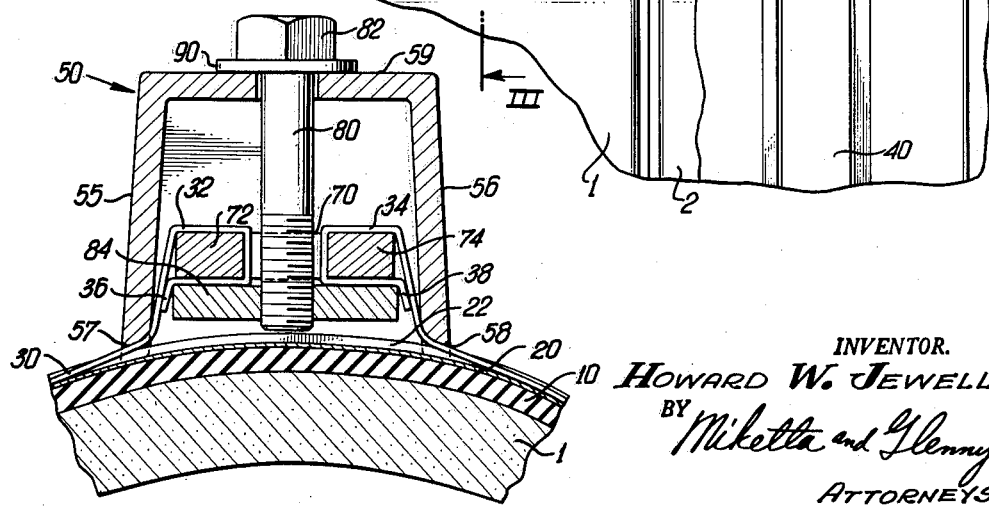
FIG. 3 is a cross sectional view of the coupling along the plane III—III in FIG. 2.

Tightening housings 50 and 60 are preferably made of cast iron having side walls 51, 52 and 61, 62 respectively. Each pair of side walls 51, 52 and 61, 62 are spaced sufficiently far apart to straddle the corresponding pair of upturned guiding beads 22 and 24 over which each is exteriorly placed. The aforementioned side walls have a slight outward taper from top to bottom and terminate in parallel downwardly facing concave foot surfaces 53, 54 and 63, 64 respectively, which are generally contoured to the outer diameter of pipe sections 1 and 2. Foot sections 53, 54 and 63, 64 are adapted to rest on and be connected to the band housing 20 as shown in FIGS. 1 to 3. As best seen in FIG. 2 in the cut away portion of tightening housing 50, the two outer foot surfaces 53 and 64 rest on the band housing 20 at a zone thereon further in from the outside edges of band housing 20 than the longitudinal edge portions 26 and 28 extend inwardly thereunder. The compressive or downward forces exerted by the tightening housings 50 and 60 are thereby applied to the rubber band 10 rather than on the more rigid edge portions 26 and 28 of the band housing 20. The end walls 55, 56 and 65, 66 of the tightening housings also have a slight outward taper from top to bottom and are provided with relief ports 57, 58 and 67, 68 at their lower ends, such ports having curved surfaces to allow the end portions of the tightening belts 30 and 40 to be received into the tightening housing 50 and 60 without a sharp bend.

Figure 4:
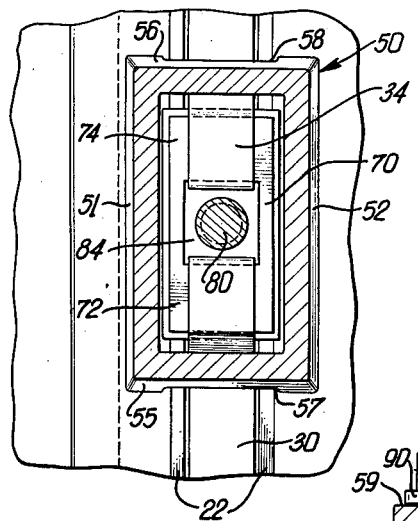
FIG. 4 is a cross sectional view of a portion of the coupling of FIG. 2 along the plane IV.

While only the exemplary means for tightening the belt 30 within the housing 50 will be explained, similar apparatus is contemplated within the housing 60 in the exemplary coupling embodiment. As best shown in FIGS. 3 and 4, the end portions 32 and 34 of tightening belt 30 pass through the relief ports 57 and 58 into the tightening housing 50 where they are fixedly attached to an open bridge element or ported link 70. Ported link 70 may be made of metal in a generally rectangular shape of sufficient size to be unrotatably constrained within the hollow housing 50.

Belt end portions 32 and 34 are preferably formed about the ported link 70 by a stamping operation to bend such portions into firm engagement with opposite ends of the link 70. The belt ends 32 and 34 are first preformed into a 160° loop and placed within the link 70. A stamping die may then be used to form the belt ends 32 and 34 about the opposite ends 72 and 74 of the link obtaining the binding engagement as shown in FIG. 3. Extensions 36 and 38 are also formed during the stamping or bending operation which extend downwardly from the link 70 to abut at portions of the bolt 80. Extensions 36 and 38 assist in holding a preferably rectangular tightening nut 84 in unrotatable fixed relation beneath the ported link 70, the underside of which is pressed upwardly by the nut 84, resulting in a holding pressure thereon which binds the tightening belt end portions 32 and 34 upon the link 70 without slippage.

Tightening bolt 80, as in the preferred embodiment, may be provided with a head 82 positioned exteriorly of housing 50 and extend downwardly through the ported upper end wall 59 of the housing 50 and thereafter through the link 70. Tightening nut 84 is attached to the lower end of bolt 80 as previously described, pressing upwardly upon the bottom of link 70 as bolt 80 is rotated and tightened. Tightening of the bolt head 82 causes the link 70 to be raised within the hollow housing 50 until the tightening bolt 80 has been sufficiently tightened as desired. A deformable washer 90 is preferably provided upon the bolt 80 between the bolt head 82 and the ported upper end wall 59 made of a deformable material such as lead, lead composition, zinc composition, Zytel or rubber. Upon tightening of the bolt 80, the proper selection of washer material and thickness will cause the washer 90 to be deformed at a bolt tension less than that required to damage the coupling or pipe sections 1 and 2. Washer 90 therefore, may be used as a signal to indicate when a desired compression around the pipe or tension in the belts has been obtained by means of the tightening belt 30 or 40. Such a deformable washer 90 may also serve as a seal against moisture intrusion about the bolt 80 since it will tend to be squeezed down into any openings between the bolt 80 and the ported upper end wall 59.

Further protection against the intrusion of moisture through the housings 50 and 60 may be provided by potting them with a suitable sealing composition, such as sulphur-silica cement, hydraulic or Portland cement, rubber composition or a resinous cementing composition, before the bolt 80 is tightened. It may be noted that a pipe coupling according to the invention may be easily folded to fit within the inside of a pipe section upon which it is to be later mounted. Such insertion into a pipe section facilitates transporting the coupling to a desired location of use and allows easy access thereof upon arrival at such location.

The coupling, according to the invention, may be adapted to fit around any shape pipe section whether their cross sections are circular, elliptical or polygonal. When the coupling is used on a square or rectangular pipe section however, portions of the coupling along the flat surfaces of the pipe section between the corners or side edges of the pipe tend to be slightly concave. Such concaveness of portions of the coupling is caused by the sharp bends about the corners or edges of such square or rectangular pipe effecting a raised area in the coupling about the such corners. The resulting concave effect in central areas of the coupling between such corners may cause separation of the tightening belts 30 and 40 from the band housing 20 disturbing the even distribution of pressure normally applied to the pipe sections by the tightening belts. This effect may be overcome by inserting a compensating strip of extruded rubber, resilient synthetic rubber composition or organic plastic between the band 10 and band housing 20 in such portions. The compensating strip inserted in these areas should have a cross section which tapers from its center to feather edges along both sides. Such shape of the inserted strip is adapted to fill up the cavity or dish shaped recess formed by the coupling in these areas such that the tightening belts 30 and 40 will contact the band housing 20 continuously about the coupling allowing as even distribution of the belt pressure about the section of the pipe joined by the coupling.

The coupling of the present invention is readily and inexpensively manufactured and assembled. The housings 50 and 60 are positively positioned by the beads on the housing. Such beads also position the tightening bands and assure that the bands lie in a plane or zone transverse to the axis of the pipe. Tightening pressure is thus most effectively distributed circumferentially and, by the use of the deformable washer, a predetermined pressure is applied, thereby insuring a leakproof, tight joint. Since the circumferential edges of resilient bead 10 are protected by the housing 20 (of strong, weatherproof, impervious and imperforate material) the coupling has a long and effective life.

It should be understood that the foregoing detailed description is of only an exemplary embodiment according to the invention and is not intended to limit the scope of the invention as defined by the following appended claims.

I claim:

1. A device for connecting adjoining ends of pipe sections in substantial alignment, said device compensating for imperfections, variations in contour and deviations in diameter of end portions of such adjoining pipe sections without reducing the maximum internal fluid pressure which may be effectively transmitted by pipe so connected, comprising: a preformed one piece annular resilient band adapted to overlie and surround ends of two adjoining pipe sections, said band having a medial tension relieving section comprising an inwardly extending lip interposed between the ends of said adjoining pipe sections and a generally V-shaped stress relieving groove formed in the outer surface of said band, said lip and groove being in the same radial plane; and a preformed extruded annular band housing of moldable organic plastic composition having a smooth inner surface overlying said band and longitudinal end portions inturned into spaced relation to such inner surface whereby said band may be grasped and retained within said band housing by said inturned edge portions.

2. A device as in claim 1 wherein, said preformed band housing is provided with an outer surface having two pairs of parallel upstanding beads extending circumferentially of the band housing, each pair of beads being adapted to guidably receive a tightening belt therebetween, said pairs being spaced from each other on said outer surface inwardly of said inturned edge portions to direct radial compression of tightening belts thereon inwardly of said inturned edge portions.

3. A device for connecting adjoining ends of pipe sections in substantial alignment, said device compensating for imperfections, variations in contour and deviations in diameter of end portions of such adjoining pipe sections without reducing the maximum internal fluid pressure which may be effectively transmitted by pipe so connected, comprising: a preformed one piece rubber composition band provided with a medial tension relieving section comprising an inwardly extending lip and a cooperating groove formed in the outer surface of said band, said lip and groove being in the same radial plane; a preformed extruded band housing of moldable organic plastic composition having a smooth inner surface and longitudinal edge portions inturned into spaced relations to such inner surface whereby said preformed rubber composition band may be grasped and retained by the inturned edge portions within said band housing, said band housing having an outer surface provided with two spaced pairs of parallel upstanding beads, each pair of beads extending circumferentially of the band housing being adapted to guidingly receive a tightening belt; and a hollow metallic tightening housing straddling each pair of guiding beads, each tightening housing having side walls terminating in parallel concaved foot surfaces contoured to the diameter of pipe sections being connected, said foot surfaces being adapted to rest on the band housing exteriorly of a pair of guiding beads, end walls provided with relief ports to receive end portions of a tightening belt, and means for tightening a belt received therein.

References Cited in the file of this patent

UNITED STATES PATENTS

| 2,114,366 | Barnes | Apr. 19, 1938 |
| 2,583,644 | Fulton | Jan. 29, 1952 |
| 2,893,760 | Jewell | July 7, 1959 |

FOREIGN PATENTS

| 513,235 | Italy | Feb. 3, 1955 |